Figure 1:
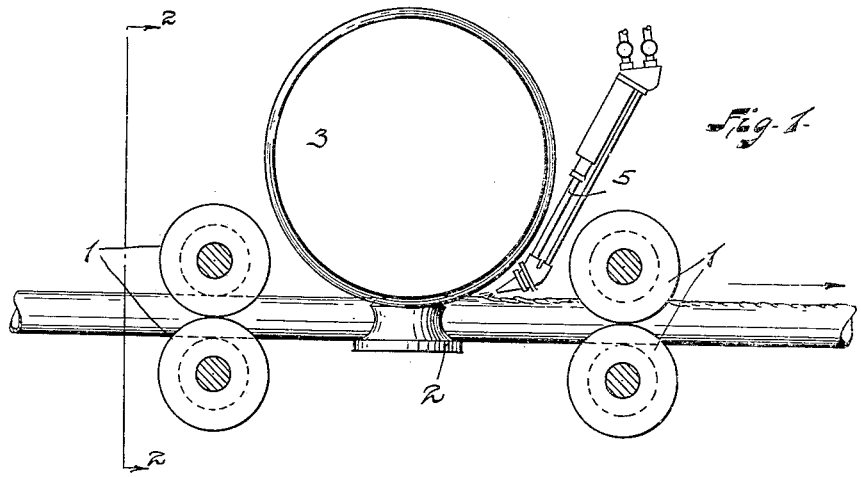

F. L. SESSIONS.
METHOD OF AND APPARATUS FOR ELECTRIC WELDING.
APPLICATION FILED MAY 7, 1913.

1,205,570. Patented Nov. 21, 1916.

Witnesses:
O. M. Kappler.
A. L. Gill.

Inventor
Frank L. Sessions
by Fay & Oberlin
Attorneys.

UNITED STATES PATENT OFFICE.

FRANK L. SESSIONS, OF LAKEWOOD, OHIO, ASSIGNOR TO THE STANDARD WELDING COMPANY, OF CLEVELAND, OHIO, A CORPORATION OF OHIO.

METHOD OF AND APPARATUS FOR ELECTRIC WELDING.

1,205,570.  Specification of Letters Patent.  Patented Nov. 21, 1916.

Application filed May 7, 1913. Serial No. 766,004.

*To all whom it may concern:*

Be it known that I, FRANK L. SESSIONS, a citizen of the United States, and a resident of Lakewood, county of Cuyahoga, and State of Ohio, have invented a new and useful Improvement in Methods of and Apparatus for Electric Welding, of which the following is a specification, the principle of the invention being herein explained and the best mode in which I have contemplated applying that principle, so as to distinguish it from other inventions.

In the manufacture of metal tubing by electric welding process, the present approved method is to run the tube through between rolls tending to force the abutting edges of the tube together and at the same time pass a heating electric current across the joint by pressing directly on the opposite edge portions of such joint two electrodes or suitable electric-current-conducting devices. While this method has proven entirely practicable, certain difficulties are nevertheless encountered in carrying it out; for instance, it is necessary, as will be obvious, that the rate of movement of the tube being welded and the character of the current employed in the welding operation should be nicely correlated; and, furthermore, fluctuations in such current require to be avoided. If the tube be fed too rapidly through the welding apparatus the abutting edges will be welded together in minute points only, a "sweat weld" as it is called, being formed, which will stand grinding and polishing but not bending; while, if the current fluctuates, the weld will be interrupted at points, or vary in character.

The object of the present invention is to provide for use in conjunction with an electric welding apparatus of the kind described above, of an igneous blast so located and directed as to supplement the action of the heating current, thus not only insuring the thorough welding together of the surfaces preliminarily heated by such current, but also smoothing down and rendering less objectionable the bur, or bead, that is formed by the pressing together of the fused edges of the tube.

To the accomplishment of the foregoing and related ends the invention, then, consists of the steps and means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 2:
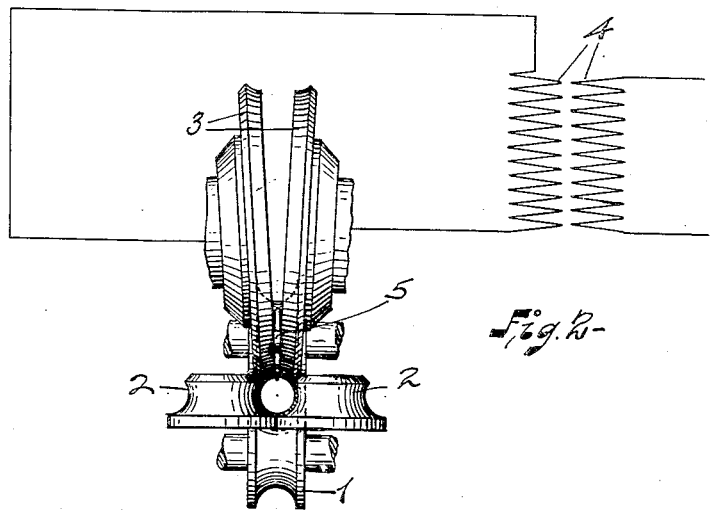
Figure 3:
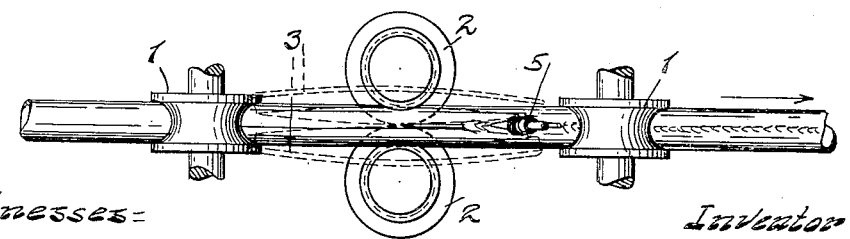

In said annexed drawing: Figure 1 is a side elevation, more or less diagrammatic in character, showing one form of apparatus adapted for carrying out my improved method; Fig. 2 is an end elevation or cross-sectional view of such apparatus as indicated by the line 2—2, Fig. 1; and Fig. 3 is a plan view of the aforesaid apparatus.

Any suitable feeding means for forcing or pulling the tube through the welding apparatus proper may be employed, but feed rolls 1 are shown in the foregoing figures as adapted for carrying out this part of the operation. By means of such feed rolls, the tube is drawn through between two pressure rolls 2 which are disposed so as to tend to force the butt edges of the tube together, as such edges come in contact with two rotatable electrodes, or rolls 3, which are suitably connected with a source of electric current, specifically with the secondary of a transformer 4, whereby a current of low voltage and high amperage is produced for passing through said electrodes and across the abutting edges of the tube. Located immediately to the rear of such pair of welding rolls, having regard to the direction of movement of the tube through the latter, is an oxy-acetylene blow pipe 5, or other suitable apparatus, adapted to deliver an igneous blast of great heat intensity, such device being arranged to direct this blast directly on the joint freshly formed by the action of the heating electric current passing from the one electrode 3 to the other. Such heating electric current is regulated to effect a substantially complete fusion of the heating edges, so that the latter, under the influence of the pressure rolls, will squeeze up the fused metal, forming a bead or bur such as has been previously referred to, and as clearly shown in Fig. 2. The igneous blast from the blow pipe, then, will strike this bur, or pressed up metal, while still more or less molten, and will have the effect of rendering the same perfectly fluid, so as to simultaneously insure the thorough homogeneous union of the abutting edge portions of the tube and flatten out the bur on the outer surface of the tube. The change in the form of the latter is best shown in Figs. 1 and 3, in the latter of which the flat, though slightly wavy, form produced by the blast is clearly evident.

It will be understood that the process is not necessarily limited to the production of tubes, since metallic articles which can have the surfaces, that are to be welded, brought together in an analogous fashion to that above described, can be advantageously welded by the conjoint use of the heating electric current and igneous blast in the fashion hereinbefore set forth. For the purpose of this specification and the following claims, accordingly, the respective edge portions of the tube may be regarded simply as two metallic articles, although they form part of the same tube.

By the use of my improved process and apparatus, not only may the thorough welding together of the parts be insured, but the operation can be materially speeded up by correlating the two heating agencies in the fashion described.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. The method of welding metallic articles together, which consists in maintaining said articles in contact under pressure along the line to be welded; and progressively passing a heating electric current across such contacting line and directing an igneous blast along the same, the one agency closely following the other and respectively preliminarily fusing and finally welding such articles together along such line.

2. The method of welding metallic articles together, which consists in maintaining such articles in contact, edge on, under pressure; and progressively passing a heating electric current across such abutting edges and directing an igneous blast along the same, the last-named agency closely following the first-named, and said agencies respectively preliminarily fusing and finally welding such edges together.

3. The method of welding metallic articles together, which consists in maintaining said articles in contact under pressure along the line to be welded; progressively passing a heating electric current across such contacting line, whereby such articles are preliminarily fused together along such line; and then progressively directing an igneous blast along such line closely following said preceding step, whereby such articles are finally welded together.

4. The method of welding metallic articles together, which consists in maintaining such articles in contact, edge on, under pressure; progressively passing a heating electric current across such abutting edges, whereby the latter are preliminarily fused together; and then progressively directing an igneous blast along such line closely following said preceding step, whereby such edges are finally welded together.

5. The method of welding metallic articles together, which consists in maintaining said articles in contact, edge on, under pressure; passing a heating electric current through such articles and across such abutting edges progressively along the latter, whereby such edges are preliminarily fused and a bur formed; and then directing an igneous blast progressively along such edges, whereby such bur is flattened down and such edges welded together.

6. The method of welding metallic articles together, which consists in maintaining said articles in contact, edge on, under pressure; passing a heating electric current through such articles and across such abutting edges progressively along the latter, whereby such edges are preliminarily fused and a bur formed; and then directing an oxy-acetylene flame progressively along such edges, whereby such bur is flattened down and such edges welded together.

7. In the manufacture of metallic tubing, the steps which consist in maintaining the edges of the tube blank in contact under pressure; and progressively passing a heating electric current across such abutting edges and directing an igneous blast along the same, the one agency closely following the other and respectively preliminarily fusing and finally welding such edges together.

8. In the manufacture of metallic tubing, the steps which consist in maintaining the edges of the tube blank in contact under pressure; progressively passing a heating electric current across such abutting edges, whereby the latter are preliminarily fused together; and then progressively directing an igneous blast along such edges closely following said preceding step, whereby such edges are finally welded together.

9. In the manufacture of metallic tubing, the steps which consist in maintaining the edges of the tube blank in contact under pressure; passing a heating electric current across such abutting edges progressively along the same, whereby the latter are preliminarily fused and a bur formed; and then directing an igneous blast progressively along such edges, whereby such bur is flattened down and such edges welded together.

10. In apparatus of the character described, the combination of means adapted to maintain the articles to be welded in contact, edge on, under pressure; electrodes disposed to contact with such articles adjacent to such edges, whereby a heating electric current may be passed across the latter; means, closely adjacent to said electrodes, adapted to direct an igneous blast along such contacting edges; and means adapted to progressively advance said articles past said electrodes and blast-means.

11. In apparatus of the character described, the combination of means adapted to maintain the articles to be welded in contact, edge on, under pressure; electrodes disposed to contact with such articles adjacent to such edges, whereby a heating electric current may be passed across the latter; means closely adjacent to said electrodes adapted to direct an igneous blast along such contacting edges; and means adapted to progressively advance said articles past said electrodes and blast-means so as to subject the edges of said articles to the action thereof in the order named.

12. In apparatus of the character described, the combination of means adapted to maintain the articles to be welded in contact, edge on, under pressure; electrodes disposed to contact with such articles adjacent to such edges, whereby a heating electric current may be passed across the latter; an oxy-acetylene blow-pipe, closely adjacent to said electrodes, adapted to direct an igneous blast along such contacting edges; and means adapted to progressively advance said articles past said electrodes and blow-pipe.

13. In apparatus for making butt-welded tubes, the combination of pressure means tending to force the butt-edges of the tube blank together; electrodes disposed to contact with the parts of said tube adjacent to such edges, whereby a heating electric current may be passed across the latter; means, closely adjacent to said electrodes, adapted to direct an igneous blast along such contacting edges; and means adapted to progressively advance said tube relatively to said electrodes and blast-means.

14. In apparatus for making butt-welded tubes, the combination of pressure means tending to force the butt-edges of the tube blank together; electrodes disposed to contact with the parts of said tube blank adjacent to such edges, whereby a heating electric current may be passed across the latter; means closely adjacent to said electrodes adapted to direct an igneous blast along such contacting edges; and means adapted to progressively advance said tube relatively to said electrodes and blast-means so as to subject the edges of said tube to the action thereof in the order named.

Signed by me, this 2nd day of May, 1913.

FRANK L. SESSIONS.

Attested by—
H. B. Fay,
Jno. F. Oberlin.